(12) United States Patent
Opris

(10) Patent No.: US 6,255,865 B1
(45) Date of Patent: Jul. 3, 2001

(54) TRACK-AND-HOLD CIRCUIT

(75) Inventor: Ion E. Opris, San Jose, CA (US)

(73) Assignee: NanoPower Technologies Inc., Newport Beach, CA (US)

( * ) Notice: Subject to any disclaimer, the term of this patent is extended or adjusted under 35 U.S.C. 154(b) by 0 days.

(21) Appl. No.: 09/433,838

(22) Filed: Nov. 3, 1999

(51) Int. Cl.$^7$ .................................................. G11C 27/02
(52) U.S. Cl. ................................. 327/94; 327/91
(58) Field of Search .......................... 327/91, 93, 94, 327/95, 96, 97, 72

(56) References Cited

U.S. PATENT DOCUMENTS

| | | | |
|---|---|---|---|
| 3,633,091 | * 1/1972 | Bowers | 327/58 |
| 4,531,095 | * 7/1985 | Ishigaki et al. | 327/94 |
| 5,872,469 | * 2/1999 | Nestler | 327/91 |
| 5,896,050 | * 4/1999 | Shinohara et al. | 327/94 |

* cited by examiner

Primary Examiner—Toan Tran
(74) Attorney, Agent, or Firm—Blakely, Sokoloff, Taylor & Zafman LLP

(57) ABSTRACT

A method and apparatus for an improved track-and-hold circuit is disclosed. By utilizing an amplifier connected to the input signal in combination with, in essence, a replica of the track-and-hold sampling transistor, a track-and-hold technique that reduces distortion and nonlinearities in the sampling process is achieved.

22 Claims, 4 Drawing Sheets

TRACK-AND-HOLD CIRCUIT

FIELD OF THE INVENTION

The present invention pertains to the field of electronic signal conversion. More particularly, the present invention relates to the ability to more accurately track, sample, and hold a signal for analog-to-digital conversion.

BACKGROUND OF THE INVENTION

A/Ds are ubiquitous and used in a variety of applications, such as, medical equipment, audio equipment, test and measurement equipment, telecommunications, military applications. imaging and video applications, etc. Many of these applications may benefit from an improved A/D converter.

In many applications a need exists for a high-speed, high-resolution front end for analog-to-digital (A/D) converters. An A/D converter takes a finite amount of time to generate a digital output representing the analog input signal strength. Generally, the higher the resolution of the A/D, the longer the conversion time. If during this conversion time the input signal changes, then the digital output may not accurately represent the input signal. Thus, for high-speed signals that change rapidly, or for high-resolution conversion, and for the combination where the signal is high-speed and high-resolution is needed, what is desirable is a way to rapidly and accurately "sample" or "track" the analog input and "hold" it steady while the A/D conversion takes place. In this way, further changes in the high-speed signal do not affect the A/D, because the input signal has been "captured." Additionally, if the input signal that was "captured" is very close in amplitude to the actual input signal and does not degrade during the A/D conversion time, that is, it is held steady, then the A/D may perform a high-resolution measurement. The circuit that performs this function is often referred to as a "sample-and-hold" circuit or a "track-and-hold" circuit. A track-and-hold circuit is generally placed between the input signal source and the digital portion of the A/D converter, and is often considered the "front-end" of an A/D converter, because it performs the analog function of tracking and holding the analog input for digital conversion.

Because the track-and-hold analog "front-end" is, in many applications, the limiting factor for speed and/or resolution, much engineering attention has been directed to how to improve and/or correct for track-and-hold inaccuracies. Approaches have concentrated on virtually every component in the track-and-hold circuit. Parameters that have been focused on include such things as the offset voltage of the input circuitry, gain errors of the input circuitry, gain linearity of the input circuitry, large and small signal bandwidth of the input circuitry, as well as the slew rate of tracking, aperture delays, aperture jitter or uncertainty, and charge transfer or charge injection. The "holding" element, conventionally a capacitor, has also been the subject of much investigation with examination of such things as leakage current, droop rate, etc.

In spite of the immense engineering efforts on all facets of the A/D speed and/or resolution issue, the current approaches still suffer limitations. These limitations as noted above are primarily in analog front-end track-and-hold circuit. One of the limitations that has persisted is the inherent nonlinearity of the sampling device that is used in a track-and-hold circuit. Analysis of this nonlinearity indicates that one of the factors is related to the range of the amplitude of the input signal. For lowered track-and-hold nonlinearities, generally, the input signal amplitude should be minimized. On the other hand, for higher resolution and/or dynamic range, generally, the desire is to handle a wide range of input voltage amplitudes from small to large. Thus, there are conflicting requirements.

A conventional track-and-hold approach is shown in the simplified circuit diagram of FIG. 1. In FIG. 1, the metal-oxide-semiconductor (MOS) transistor M1 106 is turned on and off by the voltage applied to its gate Vg 114. The transistor M1 106 is often referred to as the input switch or the sampling switch. The size of the sampling capacitor Cs 112 is dictated by the resolution of the analog-to-digital (A/D) converter (number of bits=N) and the fundamental thermal noise given by equation (1).

$$(V_S)_n^2 = \frac{kT}{C_S} \quad (1)$$

In equation (1), Vs denotes the noise voltage of the source, Cs is the sampling capacitor capacitance, k is Boltzman's constant, and T represents the temperature in degrees Kelvin.

In practical applications, the size of the sampling capacitor Cs 112 needs to be even larger, because of other noise sources (from the active devices) contributing to the total noise.

For high speed A/D converters, the major source of distortion comes from nonlinearities in the front-end track-and-hold. For the circuit in FIG. 1, the ON resistance of the transistor M1 106 is modulated by the input voltage level as given by equation (2).

$$R_{ON} = \frac{1}{k_1 \cdot \frac{W}{L} \cdot (V_g - V_{in} - V_{th})} \quad (2)$$

In equation (2), RON denotes the sampling transistor ON resistance, $k_1$ is technology dependent constant related to charge carrier mobility, W/L is the sampling transistor gate width divided by the sampling transistor gate length, Vg is the gate voltage, Vin is the input signal voltage, and Vth is the threshold voltage of the sampling transistor.

In order to keep the distortion of the front-end at the N-bit level, the total variation of the RC time constant should be less than equation (3).

$$\Delta(R_{ON}C_S) = \frac{1}{F_{in} \cdot 2^N} \quad (3)$$

In equation (3), RON denotes the sampling transistor ON resistance, Cs is the sampling capacitor capacitance, $F_{in}$ is the maximum input signal frequency, and N denotes the A/D converter resolution in number of bits. Since the capacitor size is fixed and determined by noise considerations, the ON resistance of the input switch M1 106 should have a minimal variation over the whole input voltage range in order to minimize distortion.

A straightforward implementation of the input switch M1 106, as shown in FIG. 1, uses a transistor with an extremely large width to length (W/L) ratio. Such a transistor will also have large parasitic capacitors from the source and drain junctions, Csb 108 and Cdb 110, respectively. These parasitic capacitors (Csb 108 and Cdb 110) have a strong voltage dependence, so together with the signal source impedance Rs 104 (on the order of 50 ohms), they create a distorting nonlinear filter. Moreover, the amount of distortion is directly affected by the signal source impedance.

Thus, in many applications a need exists for a high-speed, high-resolution front end for analog-to-digital (A/D) converters. In particular, it is advantageous in an A/D system to have the input track-and-hold circuit as accurate as possible over a wide range of input signal amplitudes while at the same time having the track-and-hold circuit introduce as few of its own artifacts as possible. In this way, the A/D can achieve better resolution with lowered nonlinearities.

Therefore, it is desirable to provide a track-and-hold circuit having high speed and lowered nonlinearities.

SUMMARY OF THE INVENTION

The present invention includes a method and apparatus for a track-and-hold circuit having improved input signal tracking and reduced nonlinearities. An input signal is presented to a sampling device for sampling the input signal and at the same time the input signal is presented to a control circuit. The control circuit controls the sampling device to reduce nonlinearities during sampling.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

An improved track-and-hold circuit is described. The invention, by utilizing the input signal to affect part of the track-and-hold sampling circuit is capable of reducing nonlinearities in the sampling process. More specifically, a key idea underlying this invention is to bootstrap the gate voltage of a sampling transistor during the track phase to maintain a substantially constant input signal to sampling transistor gate voltage.

Figure 1:
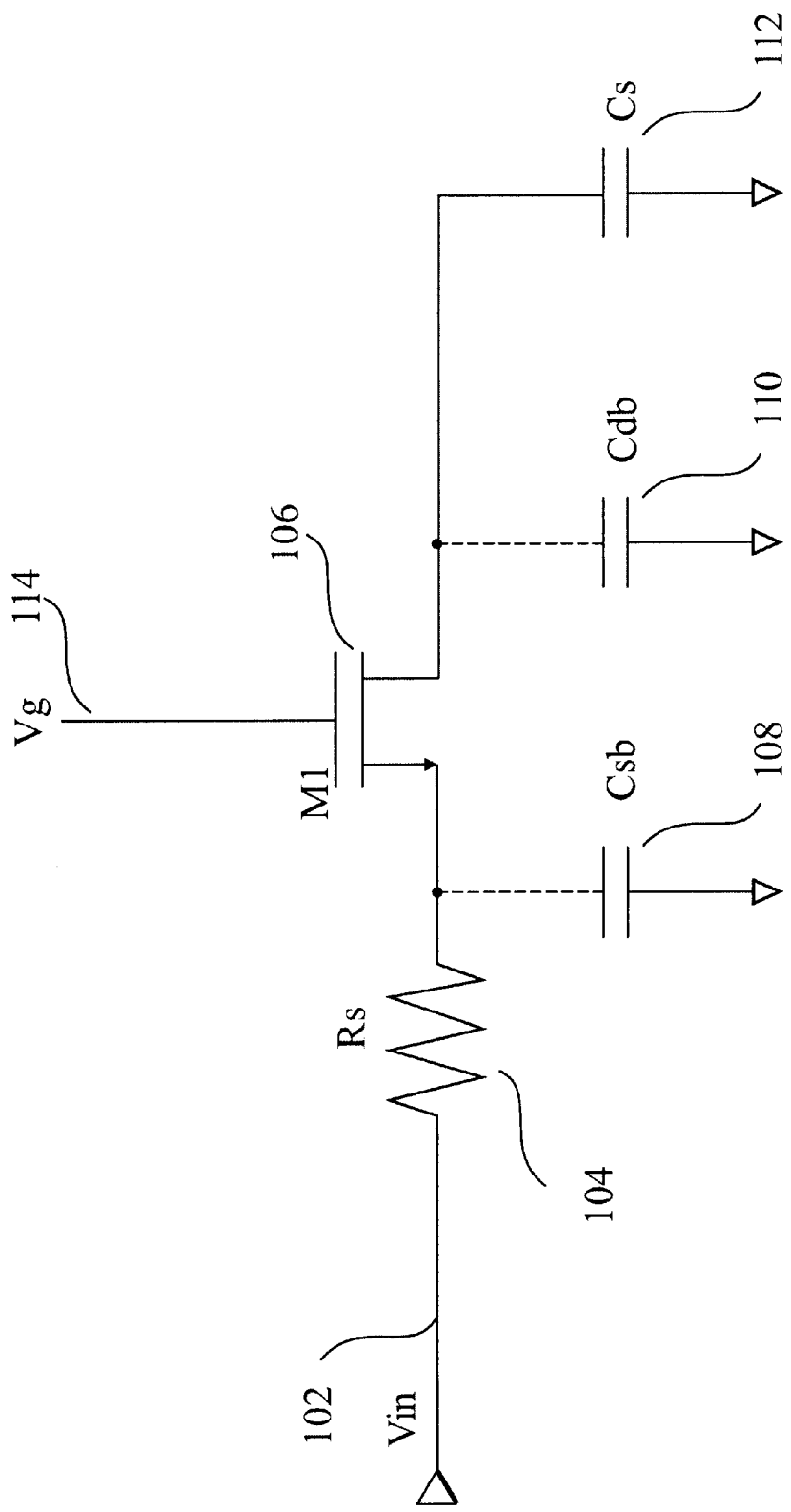
FIG. 1 is a schematic diagram of an implementation of a track-and-hold front end circuit.
Figure 2:
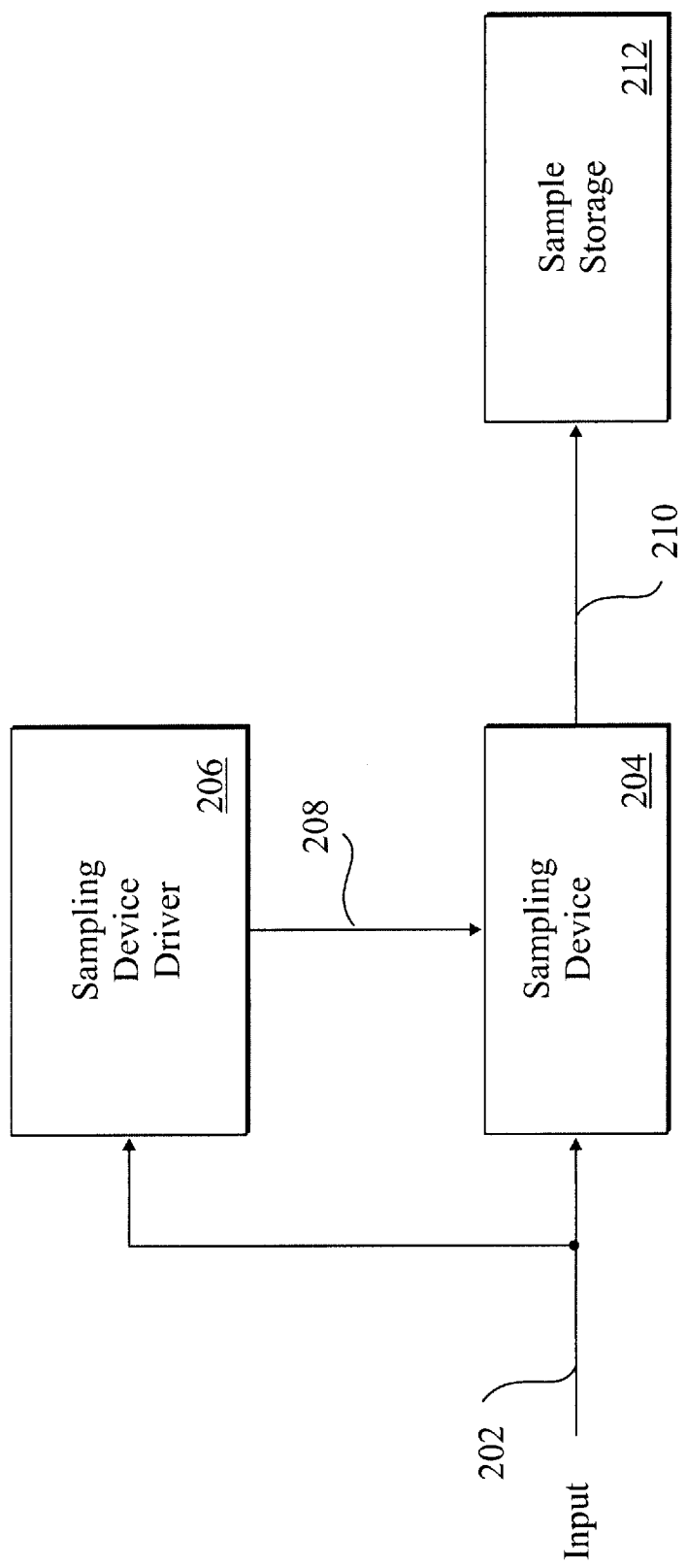
FIG. 2 is a block diagram for an improved track-and-hold.

FIG. 2 is a block diagram for an improved track-and-hold. The Input 202 is coupled to the inputs of the Sampling Device 204 and the Sampling Device Driver 206. The output 208 of the Sampling Device Driver 206 is coupled to the Sampling Device 204. The output 210 of the Sampling Device 204 is coupled to the Sample Storage 212. In operation, the Input 202 is presented to both the Sampling Device 204 and to the Sampling Device Driver 206 at the same time. Based upon the Input 202, the Sampling Device Driver 206, determines how to drive the Sampling Device 204 with a signal 208 such that the output 210 of the Sampling Device 204 has lowered nonlinearities due to the track-and-hold process, such that the sample 210 stored in the Sample Storage 212 also has lowered nonlinearities.

Figure 3:
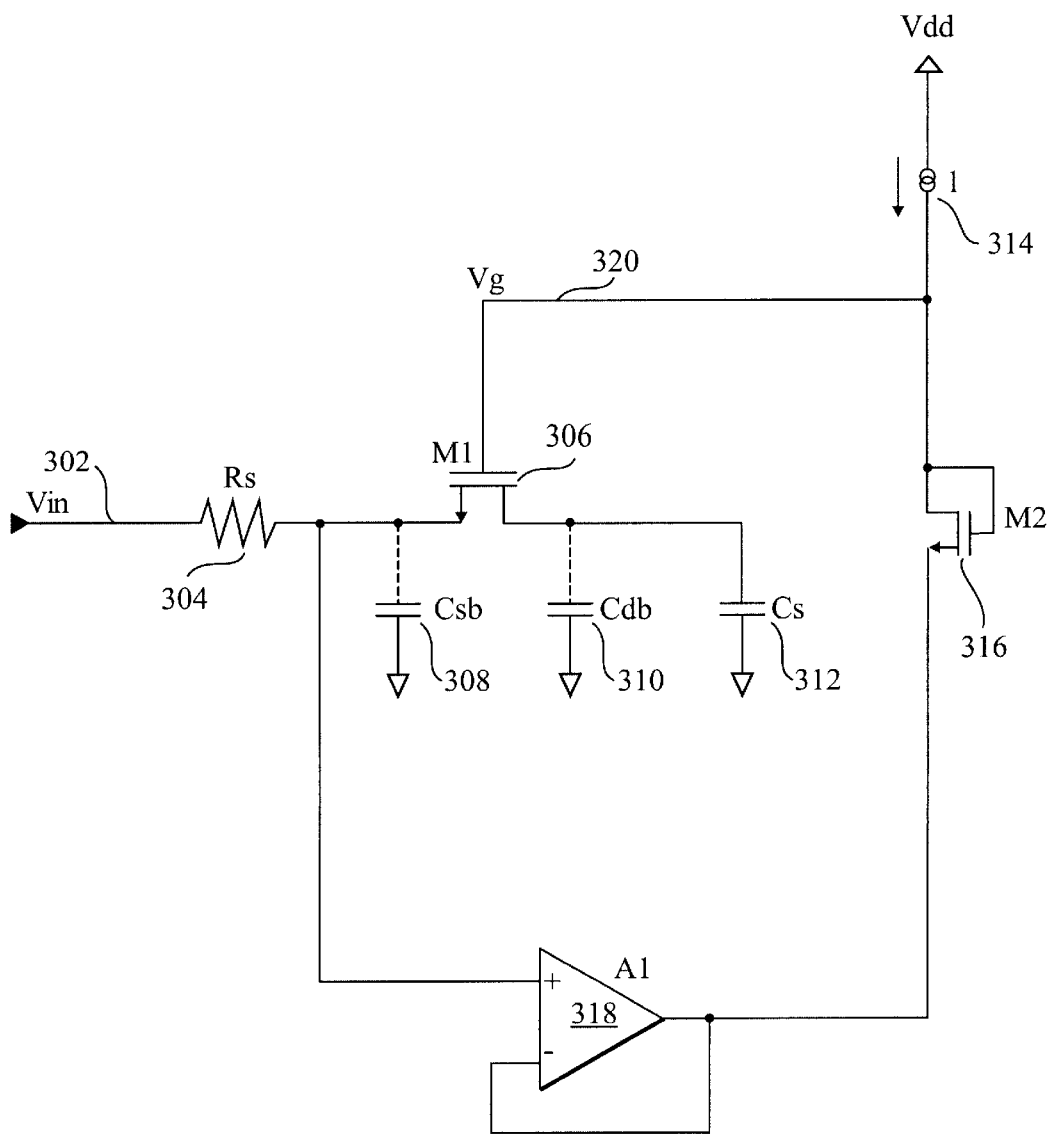
FIG. 3 is a schematic diagram of an embodiment of a circuit for an improved track-and-hold front end.

FIG. 3 is a schematic diagram of an embodiment of a circuit for an improved track-and-hold front end. The input signal Vin 302 exhibits a source resistance Rs 304 which is coupled to the positive input of amplifier A1 318 and the source of an n-type metal-oxide-semiconductor (NMOS) sampling transistor M1 306. The drain of M1 306 is coupled to the track-and-hold sampling capacitor Cs 312. Amplifier A1 318 is configured as a unity gain voltage follower, where the output of A1 318 is fed back to the negative input of A1 318. The output of A1 318 is also coupled to the source of NMOS transistor M2 316. The gate of sampling transistor M1 306 is coupled to the gate and drain of transistor M2 316 and to the current source I 314.

Referring now to both FIG. 2 and FIG. 3. The Input 202 in FIG. 2, in one embodiment, may be Vin 302 and Rs 304 as shown in FIG. 3. An alternative embodiment might be the output of an amplifier stage. The Sampling Device 204 in FIG. 2, in one embodiment, may be M1 306 and the parasitic capacitances Csb 308 and Cdb 310 as shown in FIG. 3. An alternative embodiment might be a complementary-metal-oxide-semiconductor (CMOS) switch. The Sample Storage 212 in FIG. 2, in one embodiment might be Cs 312 as shown in FIG. 3. An alternative embodiment might be any charge storage device. The Sampling Device Driver 206 in FIG. 2, in one embodiment might be A1 318, M2 316, and I 314 in FIG. 3. Signal 208 in FIG. 2, in one possible embodiment may be signal Vg 320 in FIG. 3.

A key idea underlying the circuit in FIG. 3 is to bootstrap the gate of M1 306 during the track phase to maintain a substantially constant gate overdrive voltage gate-to-source voltage (Vgs) minus threshold voltage (Vth) (Vgs–Vth). Thus, referring to equation (2), the term (Vg–Vin–Vth) remains relatively constant and thus RON is relatively constant. A simple level shifter is not adequate because of the back bias effect that changes the transistor M1 306 threshold with its input source level Vin 302. The circuit in FIG. 3 includes among other things, an input signal source Vin 302 with a source resistance Rs 304, the sampling transistor M1 306 and parasitic capacitors from the source and drain junctions (Csb 308 and Cdb 310 respectively), and the sampling capacitor Cs 312. Additionally, the circuit in FIG. 3 uses a bias circuit I 314 in conjunction with M2 316 and A1 318 to generate the M1 306 sampling transistor gate voltage Vg 320. The transistor M2 316 has a constant drain current, and, since it operates in saturation, has a constant gate overdrive. The transistor M2 316 source is connected to a voltage follower A1 318. The voltage follower A1 318 is also called a buffer. This configuration has the advantage that it compensates for the back bias threshold variation. Since the sources of transistors M1 306 and M2 316 are at the same voltage potential, these two transistors will have the same threshold voltage. Another advantage of this configuration is that the large gate capacitance of transistor M1 306 is not connected directly to the buffer A1 318 output. This arrangement improves the phase margin and the stability of the buffer 318.

Figure 4:
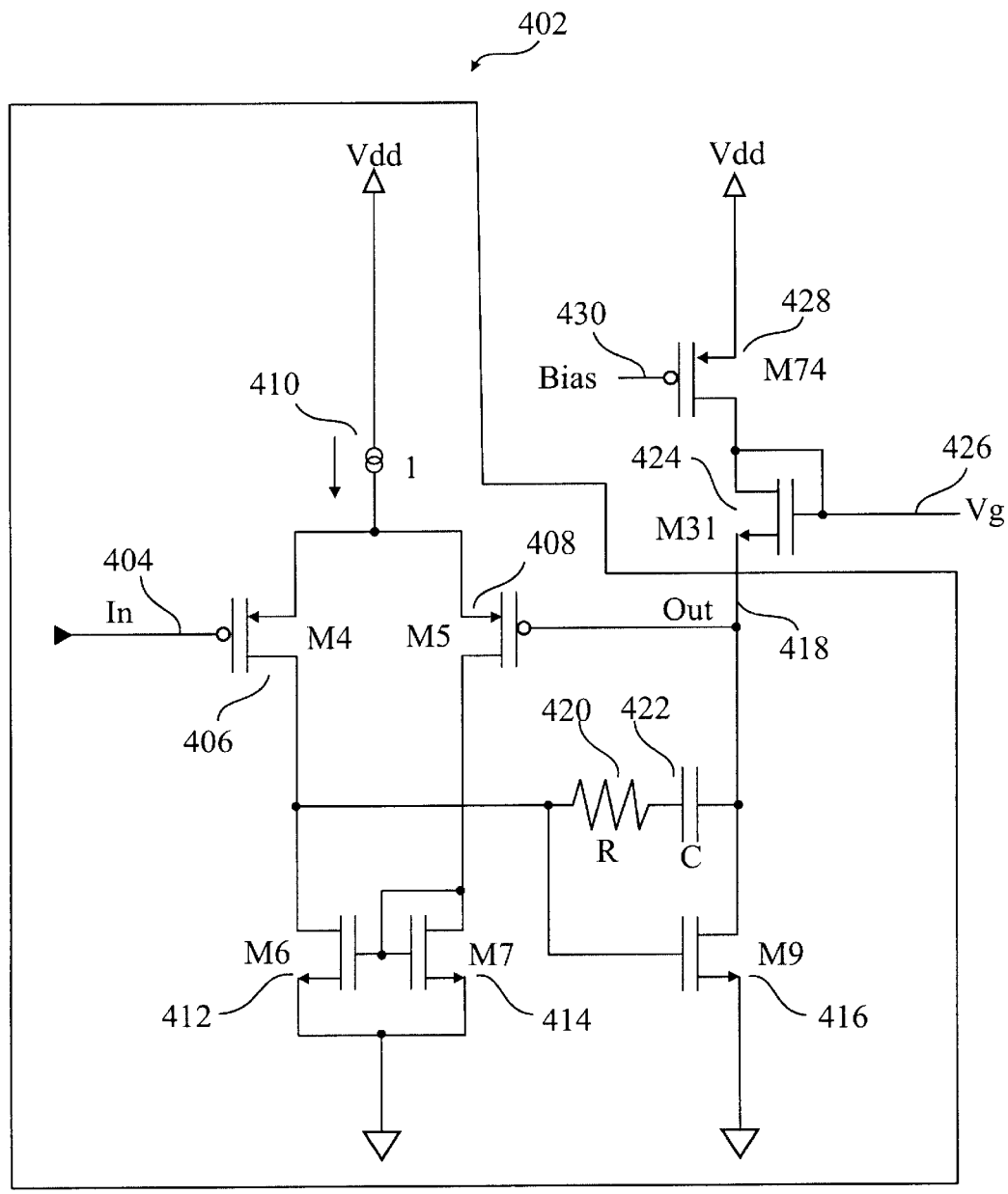
FIG. 4 is a diagram of an embodiment of a circuit for a unity gain buffer.

The bandwidth of the buffer 318 needs to be significantly higher than the maximum input signal frequency to avoid phase shifts between Vin and Vg. One embodiment of a buffer 318 is shown in the schematic diagram of FIG. 4 as 402. The buffer is a two-stage operational amplifier style amplifier circuit, with the input p-type MOS (PMOS) transistors M4 406 and M5 408, and the second stage with an n-type MOS (NMOS) transistor M9 416. The input signal In 404 is connected to transistor M4 406, whose output is coupled to M6 412 and to M9 416 and the first input of the RC circuit R 420 and C 422. Transistor M9 416 output is coupled to the second input of the RC circuit R 420 and C 422, to the input of transistor M5 408, and is the output Out 418 of the operational amplifier. Transistor M7 414 is connected to the output of M5 408. Current source I 410 is connected to the input transistors M4 406 and M5 408. Transistor M74 428 in FIG. 4, which is controlled by a bias voltage Bias 430, can be the current source I 314 in FIG. 3, and transistor M31 424 in FIG. 4 and the gate voltage Vg 426 can play the role of the level shifter M2 316 in FIG. 3. In the amplifier shown in FIG. 4, the input stage M4 406 and M5 408 is not balanced. This imbalance creates an input offset on the order of 100 mV which does not let the output voltage of the output transistor M9 416 collapse to ground for input voltages close to ground. This technique avoids large output distortion and recovery problems in the buffer and allows input voltages close to the ground rail with minimal output distortion. A tradeoff is that the potential at the sources of M1 306 and M2 316 in FIG. 3 does not track exactly, therefore, the gate overdrive voltage for M1 is not perfectly constant. This small difference, however, determines a second order effect on the M1 ON resistance.

Thus, an improved track-and-hold circuit has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of controlling a sampling device in a track-and-hold circuit, the method comprising:
   receiving an input signal; and
   using the input signal to control an impedance of the sampling device including:
      amplifying the received input signal.

2. The method, according to claim 1, wherein said receiving an input signal comprises receiving an input signal to be sampled.

3. The method, according to claim 2, wherein said using the input signal to control an impedance of the sampling device further includes using the amplified input signal to control the impedance of the sampling device, such that the sampling device has a substantially constant impedance over a specified range of amplitudes of the input signal.

4. A method of controlling a sampling device in a track-and-hold circuit, the method comprising:
   receiving an input signal; and
   using the input signal to control an impedance of the sampling device including:
      amplifying the received input signal;
      applying a proportion of the amplified received input signal to the sampling device;
      measuring the voltage on the sampling device;
      measuring the voltage of the received input signal;
      calculating a difference between the voltage on the sampling device and the voltage of the received input signal;
      comparing the difference with a predetermined desired constant; and
      adjusting the proportion of the amplified received input signal to the sampling device to minimize the difference.

5. A method of controlling a sampling device in a track-and-hold circuit, comprising:
   receiving an input signal to be sampled by the sampling device, wherein the input signal has an amplitude having a usable range;
   amplifying the input signal; and
   using the amplified input signal to control the sampling device, such that the sampling device has a substantially constant impedance over the usable range of the input signal amplitude.

6. A method of controlling a sampling device in a track-and-hold circuit, comprising:
   determining the voltage of an input signal;
   amplifying the input signal; and
   maintaining a substantially fixed voltage between the input signal and the sampling device.

7. A method for obtaining an input signal sample, comprising:
   coupling an input signal to a sampling device, the sampling device having characteristics;
   coupling the input signal to a control device input wherein the control device comprises an amplifier; and
   using the control device output to affect the sampling device such that the characteristics of the sampling device are substantially constant over a usable range of the input signal.

8. A method according to claim 7, wherein the sampling device is a transistor.

9. A method according to claim 8, wherein the transistor is a metal-oxide-semiconductor transistor (MOS).

10. A method according to claim 7, wherein the amplifier in the control device includes a buffer amplifier coupled to a like sampling device.

11. A method according to claim 10, wherein the like sampling device is a transistor.

12. A method according to claim 11, wherein the transistor is a metal-oxide-semiconductor transistor (MOS).

13. A track-and-hold circuit comprising:
   a first transistor, the first transistor having a control terminal, an input terminal, and an output terminal, wherein the input terminal is coupled to receive an input signal;
   a sampling capacitor, the output terminal of first transistor coupled to the sampling capacitor;
   an amplifier, the amplifier having an input and an output, the input signal coupled to the input of the amplifier; and
   a second transistor, the second transistor having a control terminal, an input terminal, and an output terminal, the output of the amplifier coupled to the input terminal of the second transistor, the control terminal of the second transistor coupled to the output of the second transistor and the control terminal of the first transistor.

14. The circuit in claim 13, wherein the first and second transistor are metal-oxide-semiconductor (MOS) transistors.

15. The circuit in claim 13, wherein the amplifier has a gain of substantially unity.

16. The circuit in claim 13, wherein the first and second transistor are substantially similar.

17. An analog-to-digital conversion system comprising:
   an analog signal input source;
   timing control circuitry for controlling the analog signal input source to digital conversion process; and
   a track-and-hold input section, coupled to the analog signal input source, and having:
      a first transistor, the first transistor having a control terminal, an input terminal, and an output terminal, an input signal coupled to the input terminal of the first transistor;
      a sampling capacitor, the output terminal of the first transistor coupled to the sampling capacitor;

an amplifier, the amplifier having an input and an output, the input signal coupled to the input of the amplifier;

a second transistor, the second transistor having a control terminal, an input terminal, and an output terminal, the output of the amplifier coupled to the input terminal of the second transistor; and the control terminal of the second transistor coupled to the output of the second transistor and the control terminal of the first transistor.

18. The analog-to-digital conversion system as recited in claim 17, further comprising:

an Integrated Circuit (IC) chip wherein, the first and second transistor are on the IC chip.

19. A track-and-hold circuit comprising:

means for receiving an input signal to be sampled by a sampling device, wherein the input signal has an amplitude having a usable range;

means for amplifying the input signal; and means for providing the amplified input signal to the sampling device so as to maintain a substantially constant impedance of the sampling device.

20. A track-and-hold circuit comprising:

a sampling device, the sampling device having an input, an output, and a control terminal;

an amplifier having an input and an output;

a sample storage device having an input; and wherein an input signal is coupled to the input of the sampling device and the input of the amplifier, and the output of the amplifier is coupled to the control terminal of the sampling device, and the output of the sampling device is coupled to the input of the sample storage device.

21. A track-and-hold circuit comprising:

a sampling transistor, coupled to receive an input signal; and a second transistor substantially the same as the sampling transistor, coupled to the input signal through an amplifier and biasing the sampling transistor.

22. A track-and-hold method, the method comprising:

receiving an input signal to be sampled with a sampling device having characteristics;

receiving the input signal at a sampling device driver;

amplifying the input signal;

controlling the sampling device characteristics with the sampling device driver such that the sampled input signal has substantially lowered nonlinearities; and storing the sampled input signal.

* * * * *